(12) United States Patent
Feng

(10) Patent No.: US 11,968,246 B2
(45) Date of Patent: Apr. 23, 2024

(54) PLAYBACK MODE DETERMINING METHOD AND APPARATUS

(71) Applicant: HANGZHOU HIKVISION DIGITAL TECHNOLOGY CO., LTD., Zhejiang (CN)

(72) Inventor: Zhongjian Feng, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/789,189

(22) PCT Filed: Dec. 28, 2020

(86) PCT No.: PCT/CN2020/140103
§ 371 (c)(1),
(2) Date: Jun. 25, 2022

(87) PCT Pub. No.: WO2021/136161
PCT Pub. Date: Jul. 8, 2021

(65) Prior Publication Data
US 2023/0050596 A1    Feb. 16, 2023

(30) Foreign Application Priority Data

Dec. 30, 2019  (CN) .......................... 201911402785.4

(51) Int. Cl.
*H04L 65/75*  (2022.01)
*H04N 19/12*  (2014.01)
*H04N 21/4782*  (2011.01)

(52) U.S. Cl.
CPC ........... *H04L 65/762* (2022.05); *H04N 19/12* (2014.11); *H04N 21/4782* (2013.01)

(58) Field of Classification Search
CPC .. H04L 65/762; H04N 19/12; H04N 21/4782; H04N 21/4438; H04N 21/8173; H04N 21/8193
See application file for complete search history.

(56) References Cited

U.S. PATENT DOCUMENTS

| | | |
|---|---|---|
| 9,641,890 B2 | 5/2017 | Cholas |
| 2012/0209949 A1* | 8/2012 | Deliyannis ....... H04N 21/44226 709/217 |

(Continued)

FOREIGN PATENT DOCUMENTS

| | | |
|---|---|---|
| CN | 105100824 A | 11/2015 |
| CN | 106162380 A | 11/2016 |

(Continued)

OTHER PUBLICATIONS

International Search Report for PCT/CN2020/140103 dated Mar. 10, 2021 and its English translation provided by WIPO.

(Continued)

*Primary Examiner* — Javier O Guzman
(74) *Attorney, Agent, or Firm* — Ladas & Parry, LLP

(57) ABSTRACT

The present disclosure provides a method and an apparatus for determining a playback mode. The method includes: obtaining a streaming media data packet; where the streaming media data packet includes at least an encoding format and a streaming media type of streaming media data; the streaming media type includes at least one of a video media type or an audio video media type; and determining, according to the encoding format and the streaming media type of the streaming media data, a plugin-free playback mode for playing back the streaming media data.

15 Claims, 3 Drawing Sheets

(56) References Cited

U.S. PATENT DOCUMENTS

| | | | |
|---|---|---|---|
| 2013/0276038 A1 | 10/2013 | Kiura | |
| 2018/0103261 A1* | 4/2018 | Sun | H04N 19/51 |
| 2018/0131741 A1* | 5/2018 | Song | H04N 21/23439 |
| 2018/0213014 A1* | 7/2018 | Kim | H04L 65/764 |
| 2018/0213301 A1* | 7/2018 | Cheung | G06F 16/958 |
| 2019/0098344 A1* | 3/2019 | Shanson | H04N 21/266 |

FOREIGN PATENT DOCUMENTS

| | | |
|---|---|---|
| CN | 106254961 A | 12/2016 |
| CN | 108076364 A | 5/2018 |
| CN | 108337528 A | 7/2018 |
| CN | 108337545 A | 7/2018 |
| CN | 109088887 A | 12/2018 |
| CN | 109151570 A | 1/2019 |
| CN | 109257646 A | 1/2019 |
| CN | 109981607 A | 7/2019 |
| CN | 110198479 A | 9/2019 |
| CN | 110337014 A | 10/2019 |
| CN | 110557670 A | 12/2019 |
| CN | 111356023 A | 6/2020 |
| KR | 20170114218 A | 10/2017 |

OTHER PUBLICATIONS

Written Opinion for PCT/CN2020/140103 dated Mar. 10, 2021 and its English translation provided by Google Translate.

State Intellectual Property Office of the People's Republic of China, Office Action and Search Report Issued in Application No. 2019114027854, dated Feb. 3, 2021, 14 pages. (Submitted with Machine/Partial Translation).

State Intellectual Property Office of the People's Republic of China, Office Action and Search Report Issued in Application No. 2019114027854, dated Aug. 16, 2021, 8 pages. (Submitted with Machine/Partial Translation).

Xiong Huang, "Research and Design on Video and Audio Transmission Technology based on HTML5", China Academic Journal Electronic Publishing House, May 2014, 74 pages.

* cited by examiner

PLAYBACK MODE DETERMINING METHOD AND APPARATUS

CROSS REFERENCE TO RELATED APPLICATIONS

This application is a US National Phase of a PCT Application No. PCT/CN2020/140103, filed on Dec. 28, 2020, which claims priority to Chinese Patent Application No. CN 201911402785.4 entitled "PLAYBACK MODE DETERMINING METHOD AND APPARATUS" filed on Dec. 30, 2019, the entire contents of which are incorporated herein by reference.

TECHNICAL FIELD

The present disclosure relates to the field of computer communication and in particular to methods and apparatuses for determining a playback mode.

BACKGROUND

When playing back streaming media data through a browser, an electronic device usually needs to download a plugin and plays the streaming media data on the browser through the downloaded plugin (e.g., Adobe Flash plugin).

The playback mode of streaming media may cause many attackers to attack electronic devices of users through plugins, and therefore, it is unsafe to play back streaming media data on a browser through plugins.

To solve the above problems, several playback modes for playing back video data on a browser without using plugin are proposed in this industry, and such playback mode is referred to as a plugin-free playback mode. However, in the existing plugin-free playback modes, a plugin-free playback mode is usually pre-configured in an electronic device, such that the electronic device can only play back streaming media data matching the plugin-free playback mode based on the plugin-free playback mode. In practice, the electronic device may obtain streaming media data with different types, and thus, the electronic device needs to play back these streaming media data with different types based on different requirements. As a result, in this industry, it is required to discuss and solve the problem of how the electronic device determines a plugin-free playback mode matching streaming media data when obtaining the streaming media data.

SUMMARY

In view of this, the present disclosure provides a method and an apparatus for determining a playback mode, an electronic device and a storage medium, so as to determine a playback mode of streaming media data.

In some examples, the present disclosure is implemented by the following technical solution.

According to a first aspect of the present disclosure, there is provided a method of determining a playback mode. The method is applied to an electronic device and includes:

obtaining a streaming media data packet; where the streaming media data packet includes at least an encoding format and a streaming media type of streaming media data; the streaming media type includes at least one of a video media type or an audio video media type;

determining, according to the encoding format and the streaming media type of the streaming media data, a plugin-free playback mode for playing back the streaming media data.

In some embodiments, the streaming media data packet is an earliest-received streaming media data packet received by the electronic device after the electronic device successfully establishes a connection with a service end;

after determining the plugin-free playback mode for playing back the streaming media data, the method further includes:

recording a correspondence between a connection identifier of the connection and the plugin-free playback mode;

when a streaming media data packet subsequent to the earliest-received streaming media data packet is received via the connection, determining the plugin-free playback mode corresponding to the connection according to the correspondence; and playing back the streaming media data packet subsequent to the earliest-received streaming media data packet based on the determined plugin-free playback mode.

In some embodiments, determining, according to the encoding format and the streaming media type of the streaming media data, the plugin-free playback mode for playing back the streaming media data includes:

if the encoding format of the streaming media data is a first encoding format, determining a first playback mode matching the first encoding format as the plugin-free playback mode;

if the encoding format of the streaming media data is a second encoding format, determining the plugin-free playback mode according to the streaming media type.

In some embodiments, the first encoding format includes at least an H.265 encoding format and the second encoding format includes at least an H.264 encoding format.

In some embodiments, the first playback mode is configured to indicate calling a compiled decoder to decode and play back the streaming media data of the streaming media data packet;

determining the plugin-free playback mode according to the streaming media type includes:

when the streaming media type is the audio video media type, determining a second playback mode for playing back audio video media as the plugin-free playback mode; where the second playback mode is configured to indicate: if the streaming media data packet is an audio data packet, calling a compiled decoder to decode and play back audio data of the streaming media data packet; if the streaming media data packet is a video data packet, calling a video label inbuilt in a browser of the electronic device to decode and play back video data of the streaming media data packet;

when the streaming media type is the video media type, determining a third playback mode for playing back video media as the plugin-free playback modem; where the third playback mode is configured to indicate calling a video label inbuilt in a browser of the electronic device to decode and play back the streaming media data of the streaming media data packet.

In some embodiments, the compiled decoder is a JS decoder in an initialized JSDecoder playback mode; where the JSDecoder playback mode is initialized prior to use of the first playback mode or the second playback mode;

the video label is a video label inbuilt in the browser in an initialized Media Source Extension (MSE) playback mode; the MSE playback mode is initialized after the electronic device is started up.

According to a second aspect of the present disclosure, there is provided an apparatus for determining a playback mode. The apparatus is applied to an electronic device and includes:

an obtaining unit, configured to obtain a streaming media data packet; where the streaming media data packet includes at least an encoding format and a streaming media type of streaming media data; the streaming media type includes at least one of a video media type or an audio video media type;

a determining unit, configured to, determine, according to the encoding format and the streaming media type of the streaming media data, a plugin-free playback mode for playing back the streaming media data.

In some embodiments, the streaming media data packet is an earliest-received streaming media data packet received by the electronic device after the electronic device successfully establishes a connection with a service end;

the apparatus further includes:

a recording unit, configured to, after determining the plugin-free playback mode for playing back the streaming media data, record a correspondence between a connection identifier of the connection and the plugin-free playback mode;

a playing back unit, configured to, when a streaming media data packet subsequent to the earliest-received streaming media data packet is received via the connection, determine the plugin-free playback mode corresponding to the connection according to the correspondence, and play back the streaming media data packet subsequent to the earliest-received streaming media data packet based on the determined plugin-free playback mode.

In some embodiments, the determining unit is configured to, if the streaming media data encoding format is a first encoding format, determine a first playback mode matching the first encoding format as the plugin-free playback mode; if the streaming media data encoding format is a second encoding format, determine the plugin-free playback mode according to the streaming media type.

In some embodiments, the first encoding format includes at least an H.265 encoding format, and the second encoding format includes at least an H.264 encoding format.

In some embodiments, the first playback mode is configured to indicate calling a compiled decoder to decode and play back the streaming media data of the streaming media data packet;

the determining unit is configured to: when the streaming media type is the audio video media type, determine a second playback mode for playing back audio video media as the plugin-free playback mode; where the second playback mode is configured to indicate: if the streaming media data packet is an audio data packet, calling a compiled decoder to decode and play back audio data of the streaming media data packet; if the streaming media data packet is a video data packet, calling a video label inbuilt in a browser of the electronic device to decode and play back video data of the streaming media data packet; when the streaming media type is the video media type, determine a third playback mode for playing back the video media as the plugin-free playback mode; where the third playback mode is configured to indicate calling a video label inbuilt in a browser of the electronic device to decode and play back the streaming media data of the streaming media data packet.

In some embodiments, the compiled decoder is a JS decoder in an initialized JSDecoder playback mode; where the JSDecoder playback mode is initialized prior to use of the first playback mode or the second playback mode; the video label is a video label inbuilt in the browser in an initialized Media Source Extension (MSE) playback mode; the MSE playback mode is initialized after the electronic device is started up.

According to a third aspect of the present disclosure, there is provided an electronic device including a processor and a machine-readable storage medium, where the machine-readable storage medium stores machine executable instructions executable by the processor and the processor executes the machine executable instructions to implement the above method of determining a playback mode.

According to a fourth aspect of the present disclosure, there is provided a machine-readable storage medium storing machine executable instructions, where the machine executable instructions are executed by a processor to implement the above method of determining a playback mode.

According to a fifth aspect of the present disclosure, there is provided a computer program stored in a machine-readable storage medium, where the computer program is executed by a processor to implement the above method of determining a playback mode.

As can be known from the above descriptions, in the present disclosure, the electronic device can determine a plugin-free playback mode for playing back the streaming media data based on an encoding format and a streaming media type of the streaming media data included in an obtained streaming media data packet, such that the streaming media data with different encoding formats and streaming media types can be played based on matching playback modes. In this way, for different streaming media data, a plugin-free playback mode matching the obtained streaming media data can be determined.

DETAILED DESCRIPTION OF THE EMBODIMENTS

Figure 1:
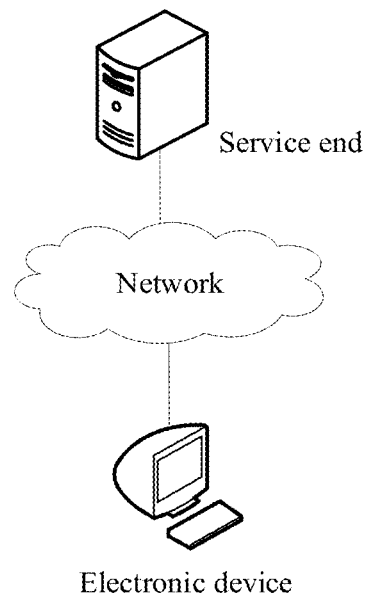
FIG. 1 is a schematic diagram illustrating a networking architecture of determining a playback mode according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular embodiments only, and are not intended to limit the present disclosure. Terms "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

Due to inability to performing decoding and rendering and the like for streaming media data, a traditional browser cannot playback the streaming media data. When an electronic device plays streaming media data by using a browser, the electronic device needs to firstly download a streaming media playback plugin, for example, Adobe Flash plugin and so on. The streaming media playback plugin acts like a streaming media player. Furthermore, the streaming media playback plugin can decode the streaming media data and renders the decoded streaming media data to a browser, so as to play back the streaming media data by using the browser. The playback mode in which streaming media data is played by using a plugin on a browser is referred to as a plugin playback mode.

Because the streaming media playback plugin is usually downloaded by an electronic device, an attacker can attack the electronic device through the streaming media playback plugin. Therefore, this plugin playback mode is not safe.

To solve the problem of the unsafety of the plugin playback mode, a playback mode in which streaming media data is played on a browser without using a plugin is proposed in this industry. This playback mode in which streaming media data is played on a browser without using a plugin is referred to as a plugin-free playback mode.

The plugin-free playback mode can include Media Source Extensions (MSE) playback mode and JavaScript Decoder (JSDecoder) playback mode and the like. Herein, the plugin-free playback mode is only illustrated and no specific limitation is made to the plugin-free playback mode.

However, for each plugin-free playback mode, the plugin-free playback mode can only play back streaming media data matching the plugin-free playback mode. For example, MSE only supports video data with an encoding format being H.264. Although the JSDecoder playback mode supports video data with encoding formats being H.264 and H.265 at the same time, since the JSDecoder playback mode only supports $3 \times 10^6$ resolution, only video data with low resolution can be supported.

Further, only one plugin-free playback mode is usually configured on an electronic device, such that the plugin-free playback mode can only play back streaming media data matching the plugin-free playback mode. Thus, the playing of multiple types of streaming media data is greatly limited.

In view of this, the present disclosure provides a method of determining a playback mode. An electronic device can determine a plugin-free playback mode for playing back streaming media data according to an encoding format and a streaming media type of the streaming media data included in an obtained streaming media data packet, such that streaming media data with different encoding formats and streaming media types can be played based on matching playback modes. Therefore, a plugin-free playback mode matching the obtained streaming media data can be determined.

Before introduction is made to a method of determining a playback mode according to the present disclosure, concepts involved in the present disclosure are firstly described in details.

1) Streaming Media

The streaming media is media performing streaming transmission. The types of the streaming media can include a video media type, an audio media type, an audio video media type and the like. Herein, the streaming media is only illustrated and no specific limitation is made to the type of the streaming media.

Video media is media including video data. For example, the video media can include: silent films, silent short videos, silent TV dramas, silent live broadcasts, and monitor videos for regions such as traffic checkpoint and residential districts. Herein, illustrative descriptions are made to the video media and no limitation is made hereto.

Audio media is media including audio data. For example, the audio media can include songs, segments of voice, and voice calls and the like. Herein, illustrative descriptions are made to the audio media and no limitation is made hereto.

Audio video media is media including both video data and audio data. For example, the audio video media can include sound films, sound TV dramas, Music Videos (MVs), sound short videos, sound live broadcasts and the like. Herein, illustrative descriptions are made to the audio video media and no limitation is made hereto.

2) Streaming Media Data Packet

Usually, streaming media is stored on a service end. When an electronic device plays streaming media, the electronic device can establish a connection with the service end, and then the service end sends the streaming media stored on the service end to the electronic device through the connection.

When sending the streaming media to the electronic device, the service end usually divides the streaming media into a plurality of streaming media data packets and sends the plurality of streaming media data packets to the electronic device in sequence.

3) MSE Playback Mode

MSE playback mode is a plugin-free playback mode. The MSE playback mode refers to that a video label is pre-configured in a browser to decode streaming media data and render the decoded streaming media data to a window of the browser, thereby playing back the streaming media data on the browser without using a plugin.

In implementations, when receiving a streaming media data packet, the electronic device can analyze the streaming media data packet to obtain streaming media data included in the streaming media data packet and send the obtained streaming media data to the browser. The browser can assemble the streaming media data into Nalu (a streaming media data format) units. Next, the browser converts the Nalu units into Fragmented Mobile Pentium 4 (FMP4) format. The browser executes the inbuilt video label to enable the video label to decode the Nalu units with FMP4 format and render the decoded Nalu units, so as to play back the streaming media data.

4) JSDecoder Playback Mode

The JSDecoder playback mode is a plugin-free playback mode. The JSDecoder playback mode refers to that: a JavaScript (a browser script language) decoder (JS decoder) independent of a browser is created in an electronic device. The JS decoder can decode streaming media data and render the decoded streaming media data to a window of the browser of the electronic device for playing back.

In implementations, when receiving a streaming media data packet from the service end, the electronic device can analyze the streaming media data packet to obtain streaming media data included in the streaming media data packet. Then, the browser can execute a pre-configured JS decoder to enable the JS decoder to decode the streaming media data and render the streaming media data to a window of the browser based on Web Graphics Library (webGL) (a 3D mapping standard) technology, thus playing back the streaming media data.

After the introduction to the above concepts is completed, introduction is made below to a networking architecture of a method of determining a playback mode.

FIG. 1 is a schematic diagram illustrating a networking architecture of a method of determining a playback mode according to an exemplary embodiment of the present disclosure.

The networking architecture shown in FIG. 1 includes at least a service end and an electronic device.

The service end stores streaming media. When the streaming media is to be played in the electronic device, the electronic device can establish a connection with the service end and then the service end sends a plurality of streaming media data packets of streaming media to the electronic device in sequence through the connection.

The electronic device is configured to receive the streaming media data packets from the service end, determine a playback mode matching the streaming media based on an encoding format and a streaming media type of the streaming media data included in the streaming media data packets, and sequentially playback the streaming media data packets sent by the service end based on the determined playback mode.

The above service end can include a server, a server cluster, a data center and the like. Herein, illustrative descriptions are made to the service end and no specific limitation is made hereto.

The above electronic device can refer to a device which is connectable to internet and configured with a browser. For example, the electronic device can be a computer, a smart phone, a tablet computer, and a laptop computer and the like. Herein, illustrative descriptions are made to the electronic device and no specific limitation is made hereto.

Detailed descriptions are made below to a method of determining a playback mode according to the present disclosure.

Figure 2:
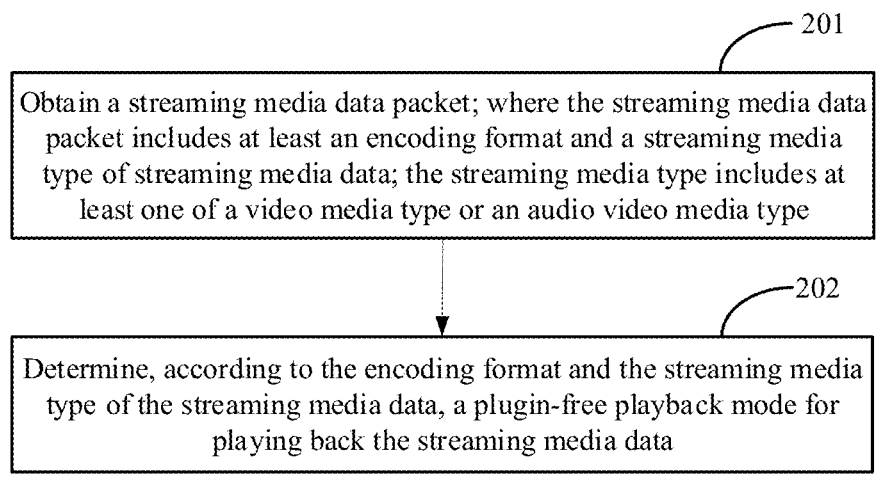
FIG. 2 is a flowchart illustrating a method of determining a playback mode according to an exemplary embodiment of the present disclosure.

FIG. 2 is a flowchart illustrating a method of determining a playback mode according to an exemplary embodiment of the present disclosure. The method can be applied to the electronic device shown in FIG. 1. The method can include the following steps.

At step 201, the electronic device obtains a streaming media data packet; where the streaming media data packet includes at least an encoding format and a streaming media type of streaming media data; the streaming media type includes at least one of a video media type or an audio video media type.

At step 202, the electronic device determines a plugin-free playback mode for playing back the streaming media data according to the encoding format and the streaming media type of the streaming media data.

When obtaining the streaming media data packet, the electronic device can receive the streaming media data packet from the service end. In practical applications, the electronic device can also obtain the streaming media data packet in other methods, for example, obtain a locally-cached streaming media data packet or the like. Herein, illustrative descriptions are made to the obtaining of the streaming media data packet and no specific limitation is made hereto.

In implementations, the service end can split locally-stored streaming media into at least one streaming media data packet. Each of the split streaming media data packets includes at least streaming media data, or a split-earliest streaming media data packet (split-first streaming media data packet) only includes streaming media attribute (for example, attribute information such as an encoding format and a streaming media type of the streaming media data) and other split streaming media data packets include streaming media data etc. No specific limitation is made herein. Furthermore, the service end can establish a connection with the electronic device. Then, the service end sends at least one streaming media data packet to the electronic device in sequence through the established connection.

The connection can be a Websocket (a full duplex communication protocol based on TCP) connection. Herein, illustrative descriptions are made to the connection and no specific limitation is made hereto.

In an optional implementation, an earliest-received streaming media data packet received by the electronic device after the electronic device successfully establishes a connection with the service end includes an encoding format and a streaming media type of streaming media data.

The electronic device can determine a plugin-free playback mode for playing back the streaming media data according to the encoding format and the streaming media type of the streaming media data included in the earliest-received streaming media data packet. When receiving a streaming media data packet subsequent to the earliest-received streaming media data packet, the electronic device can play back the streaming media data packet subsequent to the earliest-received streaming media data packet based on the determined plugin-free playback mode.

The process of "playing back the streaming media data packet subsequent to the earliest-received streaming media data packet based on the determined plugin-free playback mode" will be described below.

In implementations, the electronic device can, after determining the plugin-free playback mode, record a correspondence between a connection identifier of the connection for receiving the earliest-received streaming media data packet and the plugin-free playback mode. The electronic device can also allocate a playback window for playing back the streaming media data transmitted by the connection and store the correspondence between the connection identifier of the connection and the playback window.

When receiving the streaming media data packet subsequent to the earliest-received streaming media data packet via the connection, the electronic device can determine the plugin-free playback mode corresponding to the connection based on the correspondence between the connection identifier and the plugin-free playback mode, and play back the streaming media data packet subsequent to the earliest-received streaming media data packet based on the determined plugin-free playback mode.

During the playing, the electronic device can determine the playback window corresponding to the connection based on the correspondence between the connection identifier and the playback window, and play back the streaming media data packet subsequent to the earliest-received streaming media data packet through the determined playback window.

For example, if the service end sends 10 streaming media data packets to the electronic device via a connection 1, which are streaming media data packet 1, streaming media data packet 2, . . . streaming media data packet 10 respectively. The streaming media data packet 1 only includes the encoding format and the streaming media type of the streaming media data, and the streaming media data packet 2 to the streaming media data packet 10 include the streaming media data.

The electronic device can determine a plugin-free playback mode 1 based on the encoding format and the streaming media type of the streaming media data included in the streaming media data packet 1. The electronic device can record a correspondence 1 between the connection 1 and the plugin-free playback mode 1. The electronic device can allocate a playback window 1 to the connection 1 and record a correspondence 2 between the connection 1 and the playback window 1.

Next, when the electronic device receives the streaming media data packet 2 to the streaming media data packet 10, the electronic device can determine a plugin-free playback mode corresponding to the connection 1 (i.e., the plugin-free playback mode 1) based on the correspondence 1; and determine the playback window 1 corresponding to the connection 1 based on the correspondence 2 and play back the streaming media data packet 2 to the streaming media data packet 10 in the playback window 1 based on the plugin-free playback mode 1.

Using the playback mode has the following advantages: after determining the playback mode based on the earliest-received streaming media data packet, the electronic device can directly play back the streaming media data included in the subsequent streaming media data packets based on the determined playback mode, such that the streaming media data included in respective streaming media data packets can be played at a higher rate, making the playing of the streaming media data more coherent.

In another optional implementations, after the service end establishes a connection with the electronic device and before the service end sends the streaming media data packets, the service end can send one streaming media data packet for testing (referred to as a test packet of streaming media data) to the electronic device. The test packet includes an encoding format and a streaming media type of the streaming media data.

The electronic device can determine a plugin-free playback mode for playing back the streaming media data sent by the service end to the electronic device based on the encoding format and the streaming media type of the streaming media data included in the test packet. The electronic device can playback the streaming media data packets subsequently sent by the service end to the electronic device based on the plugin-free playback mode.

For example, after establishing a connection with the electronic device, the service end can send a test packet to the electronic device. The test packet includes an encoding format and a streaming media type of the streaming media data encoded by the service end.

The electronic device can determine a plugin-free playback mode for playing back streaming media data sent by the service end to the electronic device based on the encoding format and the streaming media type of the streaming media data included in the test packet, and record a correspondence between the plugin-free playback mode and a connection identifier of the connection established by the service end with the electronic device. Afterwards, the service end can send streaming media data packets to the electronic device, for example, can send streaming media data packet 1, streaming media data packet 2, . . . and streaming media data packet 10. The electronic device can play back streaming media data included in the streaming media data packet 1 to the streaming media data packet 10 based on the determined plugin-free playback mode.

For implementations of "playing back subsequent streaming media data packets based on the determined plugin-free playback mode", reference can be made to the above descriptions and no redundant descriptions will be made herein.

In another optional implementation, each streaming media data packet sent by the service end to the electronic device includes an encoding format and a streaming media type of streaming media data. When receiving any one streaming media data packet, the electronic device can determine a plugin-free playback mode based on the encoding format and the streaming media type of the streaming media data included in the streaming media data packet, and play back the streaming media data included in the streaming media data packet based on the determined plugin-free playback mode.

For example, it is assumed that the service end sends 10 streaming media data packets to the electronic device, which are streaming media data packet 1, streaming media data packet 2, . . . and streaming media data packet 10 respectively.

Each of the streaming media data packet 1 to the streaming media data packet 10 includes an encoding format and a streaming media type.

When receiving the streaming media data packet 1, the electronic device can determine a plugin-free playback mode based on the encoding format and the streaming media type included in the streaming media data packet 1, and play back streaming media data included in the streaming media data packet 1 based on the plugin-free playback mode.

When receiving the streaming media data packet 2, the electronic device can determine a plugin-free playback mode based on the encoding format and the streaming media type included in the streaming media data packet 2, and play back streaming media data included in the streaming media data packet 2 based on the plugin-free playback mode.

By analogy, when receiving the streaming media data packet 10, the electronic device can determine a plugin-free playback mode based on the encoding format and the streaming media type included in the streaming media data packet 10, and play back streaming media data included in the streaming media data packet 10 based on the plugin-free playback mode.

In another optional implementation, any streaming media data packet other than the earliest-received streaming media data packet sent by the service end to the electronic device includes an encoding format and a streaming media type.

When receiving a streaming media data packet prior to the any one streaming media data packet via the connection, the electronic device can firstly cache the any one streaming media data packet to a cache space corresponding to the connection. When receiving the any one streaming media data packet, the electronic device can determine a plugin-free playback mode according to the encoding format and the streaming media type of the streaming media data included in the any one streaming media data packet.

The electronic device can record a correspondence between a connection identifier of the connection and the plugin-free playback mode, and the electronic device can also allocate a playback window for playing back streaming media data carried by the connection and store a correspondence between the connection identifier of the connection and the playback window.

Then, the electronic device can play back streaming media data of the cached streaming media data packet and streaming media data included in the any one streaming media data packet and streaming media data included in subsequent streaming media data packet received after receiving the any one streaming media data packet.

In implementations, when obtaining the cached streaming media data packet from the cache space, the electronic device can determine the plugin-free playback mode corresponding to the connection corresponding to the cache space based on the correspondence between the connection identifier and the plugin-free playback mode, and determine the playback window corresponding to the connection corresponding to the cache space based on the correspondence between the connection identifier and the playback window. Then, the electronic device can play back the cached streaming media data packet in the determined playback window based on the determined plugin-free playback mode.

When the electronic device receives subsequent streaming media data packets via the connection, the electronic device can determine the plugin-free playback mode corresponding to the connection based on the correspondence between the connection identifier and the plugin-free playback mode; and can determine the playback window corresponding to the connection based on the correspondence between the connection identifier and the playback window. Then, the electronic device can play back the subsequent streaming media data packets in the determined playback window based on the determined plugin-free playback mode.

For example, it is assumed that the service end sends 10 streaming media data packets to the electronic device via the connection 1, which are streaming media data packet 1, streaming media data packet 2, . . . and streaming media data packet 10 respectively.

It is further assumed that only the streaming media data packet 5 includes an encoding format and a streaming media type of streaming media data.

When receiving the streaming media data packet 1 to the streaming media data packet 4, the electronic device can cache the streaming media data packet 1 to the streaming media data packet 4 in a cache space 1 corresponding to the connection 1.

When receiving the streaming media data packet 5 via the connection 1, the electronic device can determine a plugin-free playback mode 1 according to the encoding format and the streaming media type of the streaming media data included in the streaming media data packet 5. Then, the electronic device can record a correspondence 1 between the connection 1 and the plugin-free playback mode 1. Further, the electronic device can allocate a playback window 1 and record a correspondence 2 between the connection 1 and the playback window 1.

Then, the electronic device can play back the cached streaming media data packet 1 to the cached streaming media data packet 4 and the streaming media data packet 5 based on the plugin-free playback mode.

In implementations, the electronic device can determine a plugin-free playback mode (i.e., the plugin-free playback mode 1) corresponding to the connection 1 corresponding to the cache space 1 based on the correspondence 1, and determine the playback window (i.e., the playback window 1) corresponding to the connection 1 corresponding to the cache space 1 based on the correspondence 2. Then, the electronic device can play back the cached streaming media data packet 1 to the cached streaming media data packet 4 and the streaming media data packet 5 in the playback window 1 based on the plugin-free playback mode 1.

When receiving the streaming media data packet 6 to the streaming media data packet 10, the electronic device can play back the streaming media data packet 6 to the streaming media data packet 10 based on the plugin-free playback mode.

In implementations, the electronic device can determine the plugin-free playback mode 1 corresponding to the connection 1 based on the correspondence 1, and determine the playback window 1 corresponding to the connection 1 based on the correspondence 2. Then, the electronic device can play back the streaming media data packet 6 to the streaming media data packet 10 in the determined playback window 1 based on the determined plugin-free playback mode 1.

In the present disclosure, no specific limitation is made to "data packets including an encoding format and a streaming media type of streaming media data" and "playing back streaming media data based on a plugin-free playback mode".

It is noted that the encoding format and the streaming media type of the streaming media data included in the above streaming media data packets refer to an encoding format and a streaming media type of streaming media data for the entire streaming media.

For example, if the streaming media is audio video media, the encoding format of the streaming media data included in the above streaming media data packets is an audio encoding format and a video encoding format of the streaming media, and the streaming media type included in the above streaming media data packets is audio video media type.

For another example, if the streaming media is video media, the encoding format of the streaming media data included in the above streaming media data packets is a video encoding format, and the streaming media type included in the above streaming media data packets is video media type.

The step 202 of "determining a plugin-free playback mode for playing back streaming media data based on the encoding format and the streaming media type of the streaming media data" is introduced below in details through steps A to C.

At step A, the electronic device obtains an encoding format of streaming media data included in the streaming media data packet in step 201.

At step B, if the encoding format of the streaming media data is a first encoding format, the electronic device determines a first playback mode matching the first encoding format as the plugin-free playback mode.

In some implementations, the first encoding format can include at least: H.265 (a video encoding format) encoding format. In practical applications, the first encoding format can also be another encoding format. Specific limitation is not made to the first encoding format herein.

The first playback mode is configured to indicate calling a compiled decoder to decode and play back streaming media data of a streaming media data packet.

The compiled decoder can include a JS decoder in a JSDecoder playback mode. The compiled decoder can also be a decoder in other plugin-free playback modes. Herein, illustrative descriptions are made to the decoder and no specific limitation is made hereto.

It is noted that when the compiled decoder is a JS decoder in a JSDecoder playback mode, the first playback mode is configured to indicate the JSDecoder playback mode.

When the first encoding format is the H.265 encoding format, and the first playback mode is configured to indicate the JSDecoder playback mode, for the streaming media data packets sent by the service end, the electronic device can, based on the indication of the first playback mode, play back streaming media data of the streaming media data packets based on the JSDecoder playback mode. In some embodiments, the electronic device can analyze the streaming media data packets to obtain streaming media data of the streaming media data packets. Then, the electronic device can run the JS decoder to enable the JS decoder to decode the streaming media data, and render the decoded streaming media data to a window of a browser of the electronic device, so as to play back the streaming media data.

At step C, if the encoding format of the streaming media data is a second encoding format, a plugin-free playback mode is determined based on the streaming media type.

The second encoding format can include at least H.264 (a video encoding format) encoding format. In practical applications, the second encoding format can also be other encoding formats, for example, VP8, and VP9. Herein, illustrative descriptions are made to the second encoding format and no specific limitation is made hereto.

It is noted that the above first encoding format and second encoding format are different, and the first playback mode, the second playback mode and the third playback mode in the present disclosure are also different.

The step C of "determining the plugin-free playback mode based on the streaming media type" is introduced in details below through steps C1 to C2.

At step C1, when the streaming media type is audio video media type, the electronic device determines a second playback mode for playing back audio video media as the plugin-free playback mode.

In the embodiments of the present disclosure, when the entire streaming media is audio video media, the entire streaming media includes a plurality of streaming media data packets. The plurality of streaming media data packets include audio data packets and video data packets and any one of the plurality of streaming media data packets is an audio data packet or a video data packet. The second playback mode is configured to indicate: if the streaming media data packet is an audio data packet, calling a compiled decoder to decode and play back audio data of the streaming media data packet; if the streaming media data packet is a video data packet, calling a video label inbuilt in a browser of the electronic device to decode and play back video data of the streaming media data packet.

Respectively using different playback modes to play back the audio data packets and the video data packets in a plurality of streaming media data packets is similar to separating the audio data packets and the video data packets in the audio video media.

The above compiled decoder can include a JS decoder in a JSDecoder playback mode. The compiled decoder can also be a decoder in other plugin-free playback modes. Herein, illustrative descriptions are made to the decoder and no specific limitation is made hereto.

The above video label is a video label inbuilt in the browser in a Media Source Extension (MSE) playback mode. The video label can also be another label for playing back streaming media, which is inbuilt in the browser. Herein, illustrative descriptions are made to the label and no specific limitation is made hereto.

It is noted that, when the compiled decoder is a JS decoder in the JSDecoder playback mode, it indicates that the JSDecoder playback mode is used for playing back. When the above video label is a video label inbuilt in the browser in the MSE playback mode, it indicates that the MSE playback mode is used for playing back.

In implementations, when playing back streaming media data, for a streaming media data packet sent by the service end, the electronic device can, based on the indication of the second playback mode, analyze the streaming media data packet to determine the type of the streaming media data packet. If the streaming media type is audio video media type, the electronic device can call the JSDecoder playback mode to play back audio data of the streaming media data packets and call the MSE playback mode to play back video data of the streaming media data packets.

When calling the JSDecoder playback mode to play back audio data of the streaming media data packets, the electronic device can run the JS decoder to decode the audio data and play back the decoded audio data.

When adopting the MSE playback mode to play back video data of the streaming media data packets, the electronic device can send the video data to a browser of the electronic device. The browser can run an inbuilt video label to decode the video data and render the decoded video data to a window of the browser.

Using the playback mode has the following advantages: the MSE playback mode supports Advanced Audio Coding (AAC) audio encoding format whereas the JSDecoder playback mode supports other audio encoding formats. Therefore, if the second playback mode is adopted to playback audio video media, audio video media with different audio encoding formats can be played, greatly increasing the number of playable types of audio video media. At the same time, since the MSE playback mode is adopted to play back video media, the video media can be played at a higher resolution.

At step C2, when the streaming media type is video media type, the electronic device determines a third playback mode for playing back video media as the plugin-free playback mode.

The third playback mode is configured to indicate calling a video label inbuilt in a browser of the electronic device to decode and play back streaming media data of a streaming media data packet.

In implementations, the third playback mode is configured to indicate the electronic device to adopt the MSE playback mode for a streaming media data packet sent by the service end, so as to play back streaming media data included in the streaming media data packet. In some embodiments, the electronic device can analyze the streaming media data packet to obtain streaming media data included in the streaming media data packet and send the obtained streaming media data to the browser. The browser can adopt an inbuilt video label to decode the streaming media data and render the decoded streaming media data to the window of the browser for playing back.

Using the third playback mode has the following advantage: since the MSE playback mode supports high resolution playing back, the video media with the encoding format conforming to the MSE playback mode and the JSDecoder playback mode can be played using the MSE playback mode, so as to play back the video media at a higher resolution.

As can be seen from the above descriptions, the electronic device can determine a plugin-free playback mode for playing back streaming media data according to the encoding format and the streaming media type of the streaming media data included in the received streaming media data packet, such that streaming media data with different encoding formats and different streaming media types can be played back based on matching playback modes. In this way, for different streaming media data, a plugin-free playback mode matching the obtained streaming media data can be determined, thus playing back streaming media data with various types.

For example, by using the playback method provided by the present disclosure, video media with H.264 encoding format can be played at a high resolution, and video media with H.265 encoding format can be played, and at the same time, audio video media with different audio encoding formats can be played.

Furthermore, in the embodiments of the present disclosure, the MSE playback mode occupies small resource after initialization and the JSDecoder playback mode occupies many resources after initialization. Therefore, after being started up, the electronic device can initialize the MSE playback mode in advance. When playing back streaming media data by using the MSE playback mode, the electronic device can directly call the MSE playback mode to play back the streaming media data.

Because the JSDecoder playback mode occupies many resources after initialization, in order to save the resources of the electronic device, the electronic device can, after determining to adopt the JSDecoder playback mode, firstly initialize the JSDecoder playback mode and then call the JSDecoder playback mode to play back the streaming media data. The JSDecoder playback mode is initialized prior to use of the first playback mode or the second playback mode. The JSDecoder playback mode is initialized after it is determined to use the JSDecoder playback mode and before the first playback mode or the second playback mode is actually adopted. For example, the JSDecoder playback mode is initialized when the electronic device detects that the encoding format of the streaming media data is the first encoding format (e.g., H.265) or when the electronic device detects that the streaming media type is audio video media type and the streaming media data packets is audio data packets. In an example, when the electronic device detects the encoding format of the streaming media data is H.265, it is determined that the playback mode of the streaming media data is the JSDecoder playback mode, and at this time, the JSDecoder playback mode can be initialized.

As can be known from the above descriptions, the electronic device can determine a plugin-free playback mode for playing back streaming media data based on the encoding format and the streaming media type of the streaming media data included in the received streaming media data packet, such that the streaming media data with different encoding formats and streaming media types can be played based on matching playback modes. In this way, a plugin-free playback mode matching the obtained streaming media data can be determined.

With the first encoding format being H.265 and the second encoding format being H.264, the above method of determining a playback mode is detailed below.

Figure 3:
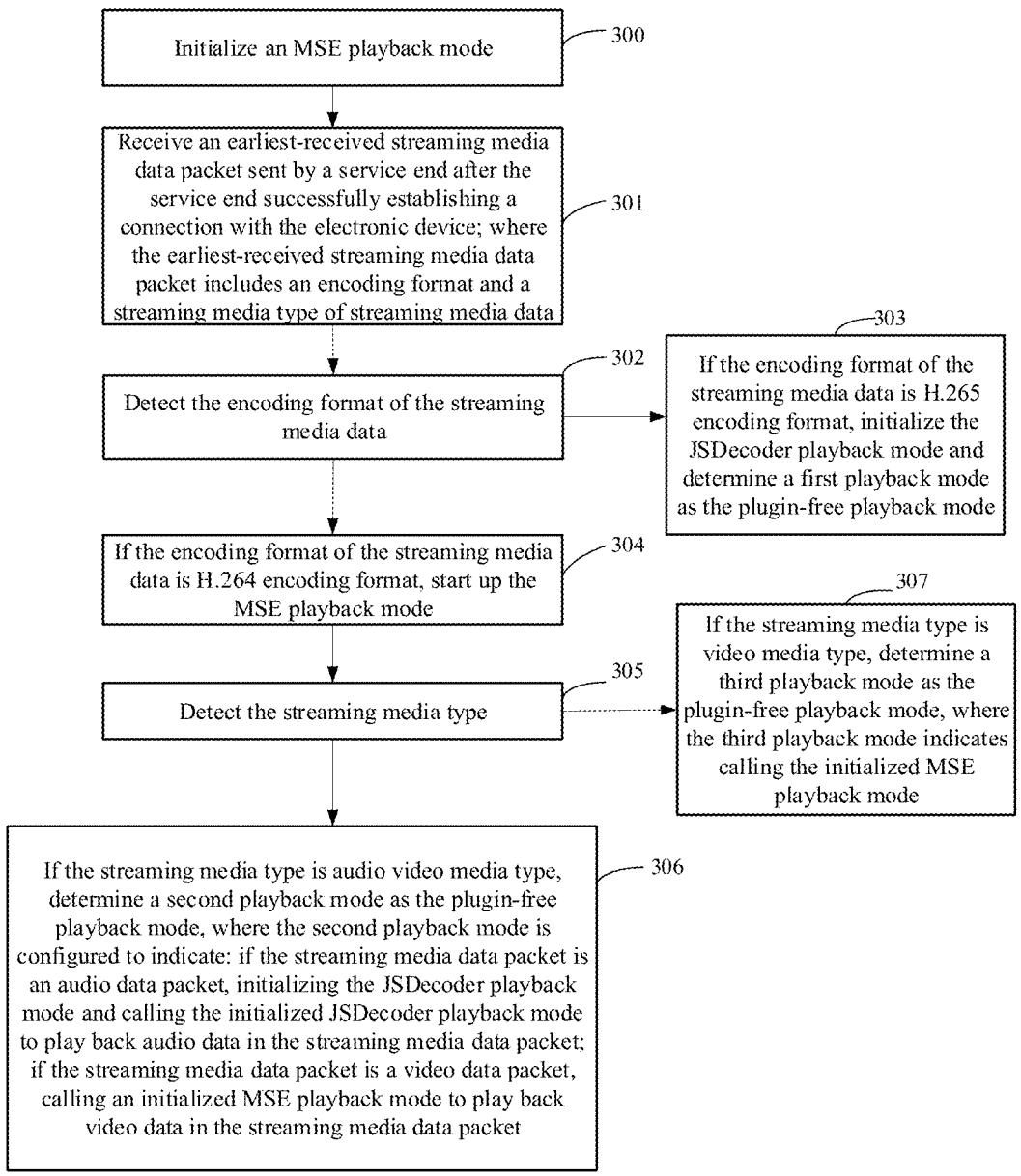
FIG. 3 is a flowchart illustrating another method of determining a playback mode according to an exemplary embodiment of the present disclosure.

FIG. 3 is a flowchart illustrating another method of determining a playback mode according to an exemplary embodiment of the present disclosure. The method can be applied to an electronic device and include the following steps.

At step 300, the electronic device initializes an MSE playback mode.

At step S301, the electronic device receives an earliest-received streaming media data packet sent by a service end after the service end successfully establishing a connection with the electronic device; the earliest-received streaming media data packet includes an encoding format and a streaming media type of streaming media data.

At step 302, the electronic device detects the encoding format of the streaming media data.

At step 303, if the encoding format of the streaming media data is H.265 encoding format, the electronic device initializes the JSDecoder playback mode and determines a first playback mode as the plugin-free playback mode, where the first playback mode indicates the JSDecoder playback mode.

Relevant descriptions can be referred to the above descriptions of step B and will not be repeated herein.

At step 304, if the encoding format of the streaming media data is H.264 encoding format, the electronic device starts up the MSE playback mode.

At step 305, the electronic device detects the streaming media type.

In some embodiments, the streaming media type can be determined by determining whether audio data is included in the streaming media data packet. If audio data is included, it is determined that the streaming media type is audio video media; and if audio data is not included, it is determined that the streaming media type is video media.

At step 306, if the streaming media type is audio video media type, the electronic device determines a second playback mode as the plugin-free playback mode, where the second playback mode is configured to indicate: if the streaming media data packet is an audio data packet, initializing the JSDecoder playback mode and calling the initialized JSDecoder playback mode to play back audio data of the streaming media data packet; if the streaming media data packet is a video data packet, calling an initialized MSE playback mode to play back video data of the streaming media data packet.

Descriptions can be referred to the above descriptions of step C1. At step 306, if the streaming media type is audio video media type, it indicates that a plurality of data packets corresponding to the streaming media include audio data packets and video data packets. If the electronic device determines that the received data packets are audio data packets, the electronic device initializes the JSDecoder playback mode and calls the initialized JSDecoder playback mode to play back the audio data of the streaming media data packets. If the electronic device determines that the received data packets are video data packets, the electronic device calls the initialized MSE playback mode to play back the video data of the streaming media data packets. At step 306, respectively using different playback modes to play back the audio data packets and the video data packets in a plurality of streaming media data packets is similar to separating the audio data packets and the video data packets.

At step 307, if the streaming media type is video media type, the electronic device determines a third playback mode as the plugin-free playback mode, where the third playback mode indicates calling the initialized MSE playback mode.

Descriptions can be referred to the descriptions of step C2 and will not be repeated herein.

Figure 4:
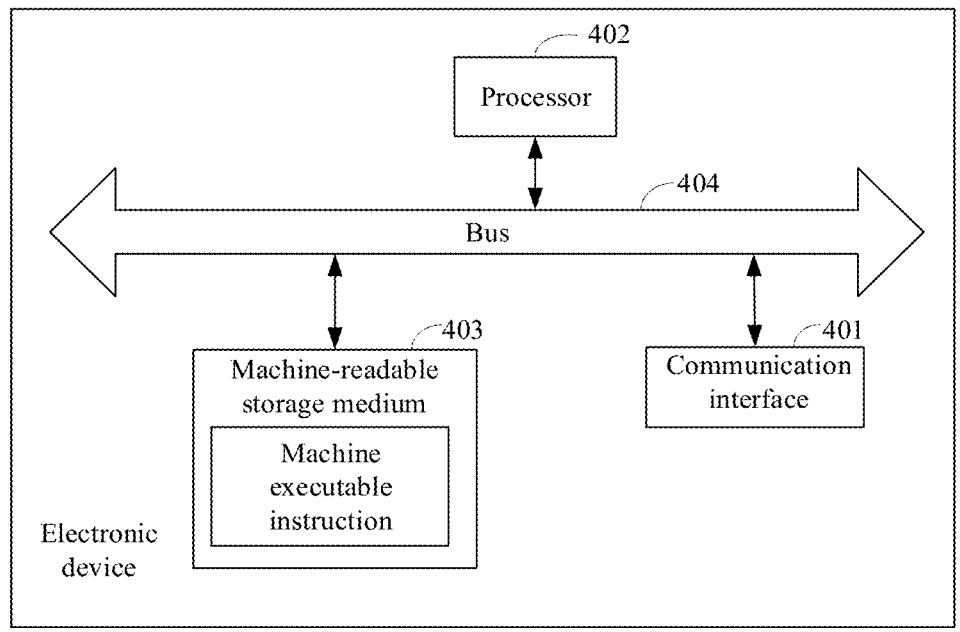
FIG. 4 is a hardware structure diagram illustrating an electronic device according to an exemplary embodiment of the present disclosure.

FIG. 4 is a hardware structure diagram illustrating an electronic device according to an exemplary embodiment of the present disclosure.

The electronic device can include a processor (for example, a processor 402 shown in FIG. 4) and a machine-readable storage medium (for example, a machine-readable storage medium 403 shown in FIG. 4) storing machine executable instructions. By reading and executing the machine executable instructions corresponding to the playback mode determination control logic in the machine-readable storage medium, the processor implements the above method of determining a playback mode.

As shown in FIG. 4, the electronic device can further include a communication interface 401 and a bus 404. The communication interface 401, the processor 402 and the machine-readable storage medium 403 communicate with each other via the bus 404. By reading and executing the machine executable instructions corresponding to the playback mode determination control logic in the machine-readable storage medium, the processor 402 can implement the above method of determining a playback mode.

The machine-readable storage medium 403 mentioned herein can be any of electronic, magnetic, optical or other physical storage devices and can contain or store information such as executable instructions, data and so on. For example, the machine-readable storage medium can be volatile or non-volatile memory or similar storage devices. In some embodiments, the machine-readable storage medium 403 can be a Radom Access Memory (RAM), a flash memory, a storage drive (e.g., hard disk drive), a solid-state hard disk, any type of storage disk (e.g., compact disk, Digital Video Disk (DVD)), or a similar storage medium, or a combination thereof.

In addition, the present disclosure further provides an apparatus for determining a playback mode, which corresponds to the above method of determining a playback mode.

Figure 5:
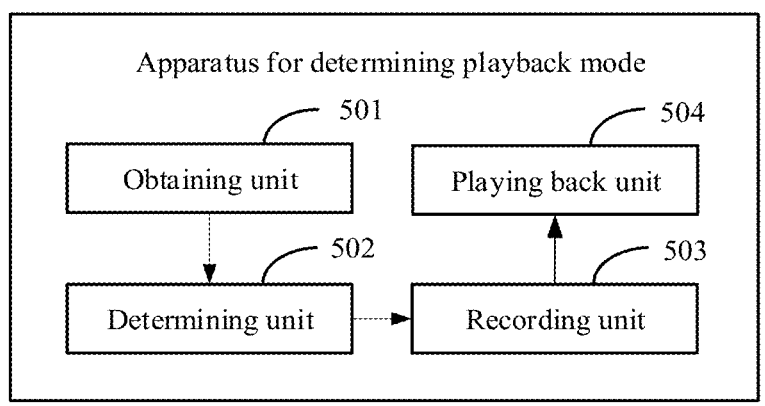
FIG. 5 is a block diagram illustrating an apparatus for determining a playback mode according to an exemplary embodiment of the present disclosure.

FIG. 5 is a block diagram illustrating an apparatus for determining a playback mode according to an exemplary embodiment of the present disclosure. The apparatus can be applied to an electronic device. The apparatus can include the following units:

an obtaining unit 501, configured to obtain a streaming media data packet; where the streaming media data packet includes at least an encoding format and a streaming media type of streaming media data; the streaming media type includes at least one of a video media type or an audio video media type;

a determining unit 502, configured to, determine, according to the encoding format and the streaming media type of the streaming media data, a plugin-free playback mode for playing back the streaming media data.

In some embodiments, the streaming media data packet is an earliest-received streaming media data packet received by the electronic device after the electronic device successfully establishes a connection with a service end.

The apparatus further includes: a recording unit 503, configured to, after the plugin-free playback mode for playing back the streaming media data is determined, record a correspondence between a connection identifier of the connection and the plugin-free playback mode;

a playing back unit 504, configured to, when a streaming media data packet subsequent to the earliest-received streaming media data packet is received via the connection, determine a plugin-free playback mode corresponding to the connection according to the correspondence, and play back the streaming media data packet subsequent to the earliest-received streaming media data packet based on the determined plugin-free playback mode.

In some embodiments, when determining the plugin-free playback mode for playing back the streaming media data based on the encoding format and the streaming media type of the streaming media data, the determining unit 502 is configured to, if the encoding format of the streaming media data is a first encoding format, determine a first playback mode matching the first encoding format as the plugin-free playback mode; if the encoding format of the streaming media data is a second encoding format, determine the plugin-free playback mode according to the streaming media type.

In some embodiments, the first encoding format includes at least H.265 encoding format and the second encoding format includes at least H.264 encoding format.

In some embodiments, the first playback mode is configured to indicate calling a compiled decoder to decode and play back the streaming media data of the streaming media data packet;

the determining unit 502 is configured to: when the streaming media type is audio video media type, determine a second playback mode for playing back audio video media as the plugin-free playback mode; where the second playback mode is configured to indicate: if the streaming media data packet is an audio data packet, calling a compiled decoder to decode and play back audio data of the streaming media data packet; if the streaming media data packet is a video data packet, calling a video label inbuilt in a browser of the electronic device to decode and play back video data of the streaming media data packet; when the streaming media type is video media type, determine a third playback mode for playing back the video media as the plugin-free playback mode; where the third playback mode is configured to indicate calling a video label inbuilt in a browser of the electronic device to decode and play back streaming media data of the streaming media data packet.

In some embodiments, the compiled decoder is a JS decoder in an initialized JSDecoder playback mode; the JSDecoder playback mode is initialized prior to use of the first playback mode or the second playback mode; the video label is a video label inbuilt in the browser in an initialized Media Source Extension (MSE) playback mode; the MSE playback mode is initialized after the electronic device is started up.

Furthermore, the present disclosure further provides a machine-readable storage medium storing machine executable instructions, where the machine executable instructions are called and executed by a processor to implement the above method of determining a playback mode.

In addition, the present disclosure further provides a computer program, where the computer program is stored in a machine-readable storage medium. The computer program is executed by a processor to implement the above method of determining a playback mode.

Details of the implementation process of the functions and effects of different units in the above-described apparatus can be referred to the implementation process of corresponding steps in the above-described method and will not be redundantly described herein.

Since the apparatus embodiments substantially correspond to the method embodiments, a reference can be made to part of the descriptions of the method embodiments for the related part. The apparatus embodiments described above are merely illustrative, where the units described as separate members can be or not be physically separated, and the members displayed as units can be or not be physical units, e.g., can be located in one place, or can be distributed to a plurality of network units. Part or all of the units can be selected according to actual requirements to implement the objectives of the solutions in the embodiments. Those of ordinary skill in the art may understand and carry out them without creative work.

The foregoing descriptions are only preferred embodiments of the present disclosure but not intended to limit the present disclosure. Various modifications, equivalent substitutions and improvements made within the spirit and principle of the present disclosure shall all fall within the scope of protection of the present disclosure.

The invention claimed is:

1. A method of determining a playback mode, being applied to an electronic device and comprising:
obtaining a streaming media data packet; wherein the streaming media data packet comprises an encoding format and a streaming media type of streaming media data; the streaming media type comprises at least one of a video media type or an audio video media type; and
determining, according to the encoding format and the streaming media type of the streaming media data, a plugin-free playback mode for playing back the streaming media data;
wherein the streaming media data packet is a data packet received by the electronic device after the electronic device successfully establishes a connection with a service end;
after determining the plugin-free playback mode for playing back the streaming media data, the method further comprises:
recording a correspondence between a connection identifier of the connection and the plugin-free playback mode;
in response to receiving a streaming media data packet subsequent to the data packet via the connection, determining the plugin-free playback mode corresponding to the connection according to the correspondence; and
playing back the streaming media data packet subsequent to the data packet based on the plugin-free playback mode;
wherein, determining, according to the encoding format and the streaming media type of the streaming media data, the plugin-free playback mode for playing back the streaming media data comprises:
in response to determining that the encoding format of the streaming media data is a first encoding format, determining a first playback mode matching the first encoding format as the plugin-free playback mode; and
in response to determining that the encoding format of the streaming media data is a second encoding format, determining the plugin-free playback mode according to the streaming media type.

2. The method of claim 1, wherein the data packet is an earliest-received streaming media data packet received by the electronic device after the electronic device successfully establishes a connection with a service end.

3. The method of claim 1, further comprising:
allocating a playback window for playing back the streaming media data transmitted by the connection;
storing a correspondence between the connection identifier of the connection and the playback window;
wherein playing back the streaming media data packet subsequent to the data packet based on the plugin-free playback mode comprising:
determining, according to the correspondence between the connection identifier of the connection and the playback window, the playback window corresponding to the connection;
playing back the streaming media data packet subsequent to the data packet through the determined playback window.

4. The method of claim 1, wherein the first encoding format comprises an H.265 encoding format, and the second encoding format comprises an H.264 encoding format.

5. The method of claim 1, wherein the first playback mode is configured to indicate calling a compiled decoder to decode and play back the streaming media data of the streaming media data packet, the compiled decoder is a JS decoder in an initialized JSDecoder playback mode; wherein the JSDecoder playback mode is initialized prior to use of the first playback mode.

6. The method of claim 1, wherein determining the plugin-free playback mode according to the streaming media type comprises:
in response to determining that the streaming media type is the audio video media type, determining a second playback mode for playing back audio video media as the plugin-free playback mode; wherein the second playback mode is configured to indicate: in response to determining that the streaming media data packet is an audio data packet, calling a compiled decoder to decode and playback audio data of the streaming media data packet; and in response to determining that the streaming media data packet is a video data packet, calling a video label inbuilt in a browser of the electronic device to decode and play back video data of the streaming media data packet.

7. The method of claim 1, wherein determining the plugin-free playback mode according to the streaming media type comprises:
in response to determining that the streaming media type is the video media type, determining a third playback mode for playing back video media as the plugin-free playback mode; wherein the third playback mode is configured to indicate calling a video label inbuilt in a browser of the electronic device to decode and play back the streaming media data of the streaming media data packet.

8. The method of claim 6, wherein the compiled decoder is a JS decoder in an initialized JSDecoder playback mode; wherein the JSDecoder playback mode is initialized prior to use of the second playback mode;
the video label is a video label inbuilt in the browser in an initialized Media Source Extension MSE playback mode; the MSE playback mode is initialized after the electronic device is started up.

9. An electronic device, comprising:
a processor;
a machine-readable storage medium storing machine executable instructions;
wherein when reading the machine executable instructions, the processor is caused to implement following operations comprising:
obtaining a streaming media data packet; wherein the streaming media data packet comprises an encoding format and a streaming media type of streaming media data; the streaming media type comprises at least one of a video media type or an audio video media type; and determining, according to the encoding format and the streaming media type of the streaming media data, a plugin-free playback mode for playing back the streaming media data;

wherein the streaming media data packet is an earliest-received streaming media data packet received by the electronic device after the electronic device successfully establishes a connection with a service end;

after determining the plugin-free playback mode for playing back the streaming media data, the processor is further caused to implement operations comprising:

recording a correspondence between a connection identifier of the connection and the plugin-free playback mode;

in response to receiving a streaming media data packet subsequent to the earliest-received streaming media data packet via the connection, determining the plugin-free playback mode corresponding to the connection according to the correspondence; and playing back the streaming media data packet subsequent to the earliest-received streaming media data packet based on the plugin-free playback mode;

wherein, determining, according to the encoding format and the streaming media type of the streaming media data, the plugin-free playback mode for playing back the streaming media data comprises:

in response to determining that the encoding format of the streaming media data is a first encoding format, determining a first playback mode matching the first encoding format as the plugin-free playback mode; and in response to determining that the encoding format of the streaming media data is a second encoding format, determining the plugin-free playback mode according to the streaming media type.

10. The electronic device of claim 9, wherein the first encoding format comprises an H.265 encoding format, and the second encoding format comprises an H.264 encoding format.

11. The electronic device of claim 9, wherein the first playback mode is configured to indicate calling a compiled decoder to decode and play back the streaming media data of the streaming media data packet;

determining the plugin-free playback mode according to the streaming media type comprises:

in response to determining that the streaming media type is the audio video media type, determining a second playback mode for playing back audio video media as the plugin-free playback mode; wherein the second playback mode is configured to indicate: in response to determining that the streaming media data packet is an audio data packet, calling a compiled decoder to decode and playback audio data of the streaming media data packet; and in response to determining that the streaming media data packet is a video data packet, calling a video label inbuilt in a browser of the electronic device to decode and play back video data of the streaming media data packet;

in response to determining that the streaming media type is the video media type, determining a third playback mode for playing back video media as the plugin-free playback mode; wherein the third playback mode is configured to indicate calling a video label inbuilt in a browser of the electronic device to decode and play back the streaming media data of the streaming media data packet.

12. The electronic device of claim 11, wherein the compiled decoder is a JS decoder in an initialized JSDecoder playback mode; wherein the JSDecoder playback mode is initialized prior to use of the first playback mode or the second playback mode;

the video label is a video label inbuilt in the browser in an initialized Media Source Extension MSE playback mode; the MSE playback mode is initialized after the electronic device is started up.

13. A non-transitory machine-readable storage medium wherein the machine-readable storage medium stores machine executable instructions which are executed by a processor to implement following operations comprising:

obtaining a streaming media data packet; wherein the streaming media data packet comprises an encoding format and a streaming media type of streaming media data; the streaming media type comprises at least one of a video media type or an audio video media type;

determining, according to the encoding format and the streaming media type of the streaming media data, a plugin-free playback mode for playing back the streaming media data;

wherein the streaming media data packet is an earliest-received streaming media data packet received by the electronic device after the electronic device successfully establishes a connection with a service end;

after determining the plugin-free playback mode for playing back the streaming media data, the processor is further caused to implement operations comprising:

recording a correspondence between a connection identifier of the connection and the plugin-free playback mode;

in response to receiving a streaming media data packet subsequent to the earliest-received streaming media data packet via the connection, determining the plugin-free playback mode corresponding to the connection according to the correspondence; and playing back the streaming media data packet subsequent to the earliest-received streaming media data packet based on the plugin-free playback mode;

wherein, determining, according to the encoding format and the streaming media type of the streaming media data, the plugin-free playback mode for playing back the streaming media data comprises:

in response to determining that the encoding format of the streaming media data is a first encoding format, determining a first playback mode matching the first encoding format as the plugin-free playback mode;

in response to determining that the encoding format of the streaming media data is a second encoding format, determining the plugin-free playback mode according to the streaming media type.

14. The non-transitory machine-readable storage medium of claim 13, wherein the streaming media data packet is an earliest-received streaming media data packet received by the processor after the processor successfully establishes a connection with a service end;

after determining the plugin-free playback mode for playing back the streaming media data, the processor is further caused to implement operations comprising:

recording a correspondence between a connection identifier of the connection and the plugin-free playback mode;

in response to receiving a streaming media data packet subsequent to the earliest-received streaming media data packet via the connection, determining the plugin-free playback mode corresponding to the connection according to the correspondence; and playing back the streaming media data packet subsequent to the earliest-received streaming media data packet based on the plugin-free playback mode.

15. The non-transitory machine-readable storage medium of claim 13, wherein the first playback mode is configured to indicate calling a compiled decoder to decode and play back the streaming media data of the streaming media data packet;

determining the plugin-free playback mode according to the streaming media type comprises:

in response to determining that the streaming media type is the audio video media type, determining a second playback mode for playing back audio video media as the plugin-free playback mode; wherein the second playback mode is configured to indicate: in response to determining that the streaming media data packet is an audio data packet, calling a compiled decoder to decode and playback audio data of the streaming media data packet; and in response to determining that the streaming media data packet is a video data packet, calling a video label inbuilt in a browser of the electronic device to decode and play back video data of the streaming media data packet;

in response to determining that the streaming media type is the video media type, determining a third playback mode for playing back video media as the plugin-free playback mode; wherein the third playback mode is configured to indicate calling a video label inbuilt in a browser of the electronic device to decode and play back the streaming media data of the streaming media data packet.

* * * * *